UNITED STATES PATENT OFFICE.

E. SEELEY, OF SCRANTON, PENNSYLVANIA.

IMPROVED COMPOSITION FOR CONCRETE PAVEMENTS.

Specification forming part of Letters Patent No. 44,117, dated September 6, 1864.

*To all whom it may concern:*

Be it known that I, E. SEELEY, of Scranton, in the county of Luzerne and State of Pennsylvania, have invented a new and Improved Composition for Concrete Pavements, &c.; and I do hereby declare that the following is a full, clear, and exact description thereof, which will enable others skilled in the art to fully understand and make use of the same.

This invention relates to a composition which can be used with advantage for sidewalks, garden-walks, cellar-floors, and wagon-roads; also for roofing buildings, for bridge abutments and arches, and for lining reservoirs or aqueducts.

The invention consists in a composition of sulphur, gas-tar, and silica, which is mixed together in a peculiar manner. The silica is heated to the melting-point of sulphur—say 230° Fahrenheit—so that the same combines with the sulphur and gas-tar, and the mixture produced is much more intimate and uniform than it is when the silica is added cold. The proportion in which I use the above-named ingredients is about as follows: sulphur, three parts by weight; gas-tar, twelve parts by weight; silica, sixty parts by weight; but it must be remarked that this proportion must be varied according to the place where the composition is to be used. The silica I use in the form of pebbles, or of coarse or fine sand, according to the destination of the composition. For sidewalks and garden-walks pebbles can be used; but for roofing purposes and for lining reservoirs, &c., I prefer to use sand. Before I mix these ingredients together I heat the silica in a separate vessel to the melting-point of sulphur—say about 230° Fahrenheit—and the sulphur I melt in a separate vessel, together with the gas-tar, and when these ingredients have been intimately mixed I add the heated silica and stir the whole mass until the silica is diffused uniformly throughout.

When the composition is ready it is applied hot by pouring it on the ground where a walk or floor is to be made, or on the roof or other part of a building when such part is to be protected against the influence of moisture; or when it is to be used as a lining of a reservoir or aqueduct it is applied in such a state that it will set as soon as it comes in contact with the surface to which it is applied. It forms a water-tight, firm, and durable composition, which is not liable to crack or scale off, and which resists the influence of the atmosphere and the changes of temperature in any climate.

I claim as new and desire to secure by Letters Patent—

1. The within-described composition, mixed together, of the ingredients specified, about in the proportion and substantially in the manner set forth.

2. Heating the silica to 230° (more or less) before mixing it with the other ingredients, substantially as and for the purpose described.

E. SEELEY.

Witnesses:
   JAMES C. MINELL,
   G. H. WALTER.